US011650491B2

United States Patent
Guo et al.

(10) Patent No.: US 11,650,491 B2
(45) Date of Patent: May 16, 2023

(54) LIGHT-SOURCE SYSTEM FOR OPTICAL PROJECTION AND PROJECTION DEVICE COMPRISING THE SAME

(71) Applicant: Appotronics Corporation Limited, Shenzhen (CN)

(72) Inventors: Zuqiang Guo, Shenzhen (CN); Peng Du, Shenzhen (CN); Zeqin Wang, Shenzhen (CN); Yi Li, Shenzhen (CN)

(73) Assignee: APPOTRONICS CORPORATION LIMITED, Guangdong (CN)

( * ) Notice: Subject to any disclaimer, the term of this patent is extended or adjusted under 35 U.S.C. 154(b) by 74 days.

(21) Appl. No.: 17/273,771

(22) PCT Filed: Apr. 8, 2019

(86) PCT No.: PCT/CN2019/081645
§ 371 (c)(1),
(2) Date: Mar. 5, 2021

(87) PCT Pub. No.: WO2020/048122
PCT Pub. Date: Mar. 12, 2020

(65) Prior Publication Data
US 2021/0318602 A1    Oct. 14, 2021

(30) Foreign Application Priority Data

Sep. 7, 2018  (CN) .......................... 201811045523.2

(51) Int. Cl.
*G03B 21/20*  (2006.01)
*G02B 27/10*  (2006.01)
*G03B 21/28*  (2006.01)

(52) U.S. Cl.
CPC .......... *G03B 21/204* (2013.01); *G02B 27/102* (2013.01); *G03B 21/28* (2013.01)

(58) Field of Classification Search
CPC .................................................... G03B 21/204
See application file for complete search history.

(56) References Cited

U.S. PATENT DOCUMENTS 8,894,213 B2 *  11/2014  Sugiyama ............ G03B 21/204
353/34
9,348,200 B2 *  5/2016  Takahashi ............ G03B 21/204
(Continued)

FOREIGN PATENT DOCUMENTS

CN      104583864 A    4/2015
CN      104965384 A   10/2015
(Continued)

OTHER PUBLICATIONS

Supplementary Search dated Oct. 18, 2021 (Application No. 2018110455232).
(Continued)

*Primary Examiner* — Bao-Luan Q Le
(74) *Attorney, Agent, or Firm* — The Dobrusin Law Firm, P.C.

(57) ABSTRACT

The present disclosure provides a light source system and a projection device. The light source system includes: a laser light source, a supplementary light source, a wavelength conversion device and an imaging subsystem. The laser light source is configured to emit laser light. The supplementary light source is configured to emit supplementary light. The wavelength conversion device is configured to convert the laser light into excited light and output first light including the excited light and the laser light. The imaging subsystem is configured to form a first light imaging beam, a supplementary light imaging beam, and a mixed light imaging beam; the imaging subsystem includes a light combining device and a reflective assembly, the light combining device is placed at an intersection of the first light imaging beam and the supplementary light imaging beam, and the reflec-
(Continued)

tive assembly is placed between the wavelength conversion device and the light combining device.

18 Claims, 5 Drawing Sheets

(56)         References Cited

U.S. PATENT DOCUMENTS

| | | | |
|---|---|---|---|
| 9,544,554 B2* | 1/2017 | Murai | G03B 21/2086 |
| 9,631,792 B2* | 4/2017 | Hu | G02B 19/0047 |
| 9,664,989 B2* | 5/2017 | Bommerbach | H04N 9/3158 |
| 9,939,719 B2* | 4/2018 | Bommersbach | H04N 9/3158 |
| 10,257,480 B2* | 4/2019 | Chikahisa | H04N 9/3167 |
| 10,386,705 B2* | 8/2019 | Hu | G03B 21/008 |
| 11,022,870 B2* | 6/2021 | Hayashi | G03B 21/2013 |
| 11,048,157 B2* | 6/2021 | Hu | G03B 21/2066 |
| 11,156,908 B2* | 10/2021 | Chen | F21V 13/00 |
| 11,340,521 B2* | 5/2022 | Bommersbach | H04N 9/3102 |
| 2003/0222198 A1 | 12/2003 | Olszak et al. | |
| 2009/0154886 A1 | 6/2009 | Lewis et al. | |
| 2012/0268503 A1* | 10/2012 | Sugiyama | H04N 9/3161 362/84 |
| 2013/0258639 A1* | 10/2013 | Hu | G03B 21/2066 362/84 |
| 2013/0322055 A1* | 12/2013 | Sugiyama | G03B 21/204 362/84 |
| 2014/0268069 A1* | 9/2014 | Takahashi | G03B 21/2066 353/31 |
| 2014/0347634 A1* | 11/2014 | Bommerbach | G03B 33/14 353/121 |
| 2015/0109584 A1* | 4/2015 | Murai | H04N 9/3114 353/31 |
| 2016/0033853 A1 | 2/2016 | Akiyama | |
| 2016/0131967 A1* | 5/2016 | Saitou | G03B 21/204 362/232 |
| 2017/0013240 A1* | 1/2017 | Chikahisa | H04N 9/3105 |
| 2018/0080626 A1 | 3/2018 | Hu | |
| 2018/0129124 A1* | 5/2018 | Hu | G02B 27/10 |
| 2019/0179220 A1* | 6/2019 | Hu | G03B 21/2013 |
| 2020/0012177 A1* | 1/2020 | Chen | G03B 21/204 |
| 2020/0341359 A1* | 10/2020 | Hayashi | G03B 21/2073 |
| 2021/0286246 A1* | 9/2021 | Hu | G03B 21/206 |

FOREIGN PATENT DOCUMENTS

| | | |
|---|---|---|
| CN | 106125482 A | 11/2016 |
| CN | 106444254 A | 2/2017 |
| CN | 205992114 U | 3/2017 |
| CN | 206112853 U | 4/2017 |
| CN | 107479311 A1 | 12/2017 |
| CN | 207457687 U | 6/2018 |
| CN | 108351585 A | 7/2018 |

OTHER PUBLICATIONS

International Search Report dated Jun. 27, 2019, Application No. PCT/CN2019/081645.
Chinese Office Action dated Jul. 7, 2020, Applictation No. 201811045523.2.

* cited by examiner

LIGHT-SOURCE SYSTEM FOR OPTICAL PROJECTION AND PROJECTION DEVICE COMPRISING THE SAME

TECHNICAL FIELD

The present disclosure relates to the field of optical technology, in particular, to a light source system and a projection device.

BACKGROUND

In the current projection light sources, a blue laser is usually used to excite a phosphor color section to obtain three primary colors, and the excited fluorescence spectrum has a relative wide bandwidth. In order to obtain primary-color light with higher color purity, usually it needs to filter the excited fluorescence spectrum to obtain purer primary-color light, which greatly reduces output brightness of the light source.

In order to achieve a light source device with high brightness and a wide color gamut, a red laser or a green laser is added to the light source to mix the laser light with fluorescent light, which ensures higher output brightness of the light source without the need to filter more fluorescent light, while improving the display color gamut of the light source.

In the technology of combining fluorescent light and laser light, the technology of mixing the two by using the difference in etendue between laser light and fluorescent light can achieve higher efficiency, but at the same time, there is a need to add optical devices and optical path to achieve the combination of light, which increases the size of the fluorescent color wheel and the volume of the light source system. With the improvement or people's life quality, the pursuit of products is becoming more and more extreme. While pursuing high brightness and wide color gamut display, compactness and exquisiteness of devices are also demanded. Therefore, there is a need to make reasonable use of a structural space of the light source to achieve miniaturization of the devices.

SUMMARY

The purpose of the present disclosure is to provide a light source system, which can, by a reasonable configuration of the optical path, make full use of the structural space of the light source, and have a smaller volume while satisfying high-brightness and wide-color-gamut display. The embodiments of the present disclosure achieve the above-mentioned purpose through the following technical solutions.

In a first aspect, the present disclosure provides a light source system. The light source system includes a laser light source, a supplementary light source, a wavelength conversion device, and an imaging subsystem. The laser light source is configured to emit laser to light. The supplementary light source is configured to emit supplementary light. The wavelength conversion device is configured to convert the laser light into excited light. The imaging subsystem is configured to form a first light imaging beam, a supplementary light imaging beam, and a mixed light imaging beam. The mixed light imaging beam is formed by combining the first light imaging beam and the supplementary light imaging beam. The first light imaging beam, the supplementary light imaging beam, and the mixed light imaging light beam are transmitted in the imaging subsystem and respectively form a first light imaging optical path, a supplementary light imaging optical path, and a mixed light imaging optical path; the imaging subsystem includes a light combining device and a reflective assembly, and the light combining device is arranged at an intersection of the first light imaging beam and the supplementary light imaging beam to combine the first light and the supplementary light and transmit the combined light along the mixed light imaging optical path; and the reflective assembly is arranged between the wavelength conversion device and the light combining device to reflect the first light imaging beam.

In a second aspect, the present disclosure provides a projection device including the above-mentioned light source system.

Compared with the prior art, the light source system and the projection device provided by the present disclosure make the optical path be folded by arranging the reflective assembly in the imaging subsystem, thereby reasonably utilizing the optical path, and thus miniaturizing the wavelength conversion device and improving the utilization rate of the space in the optical path, reducing the volume of the light source system.

These or other aspects of the present disclosure will be more concise and understandable in the description of the following embodiments.

DESCRIPTION OF EMBODIMENTS

Figure 1:
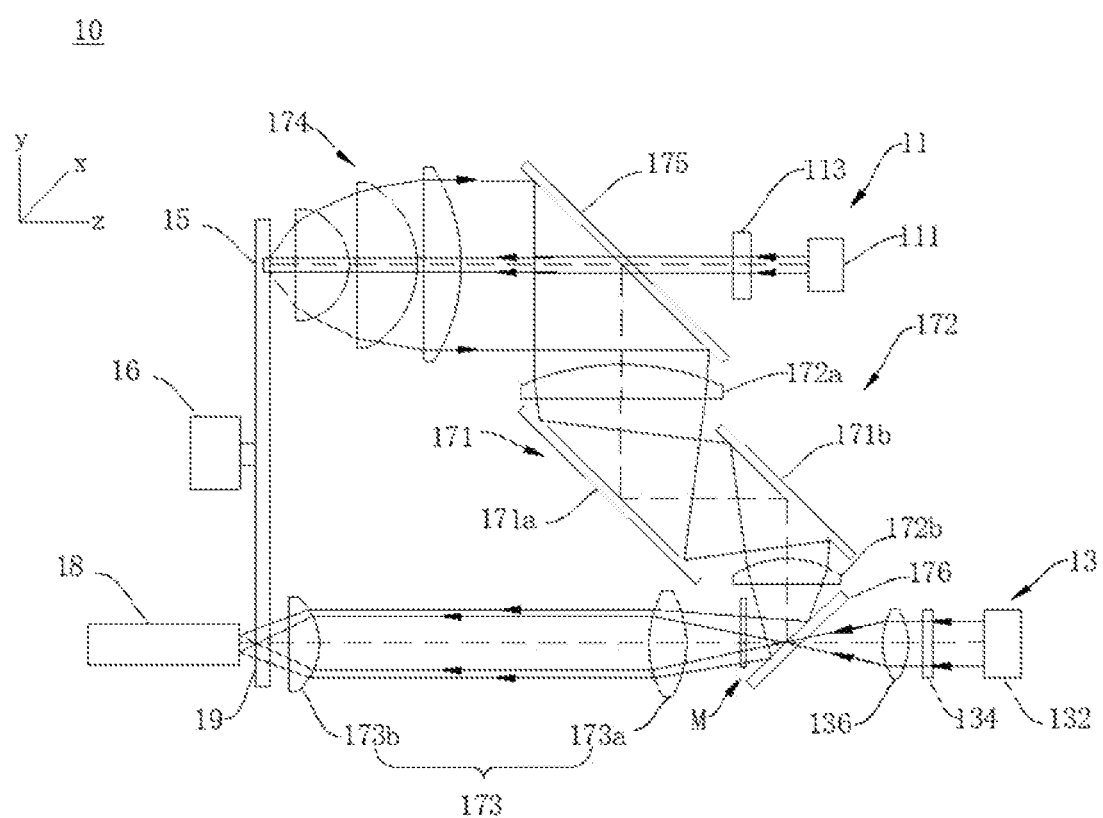
FIG. 1 is a schematic structural diagram of a light source system provided by a first embodiment of the present disclosure.
Figure 2:
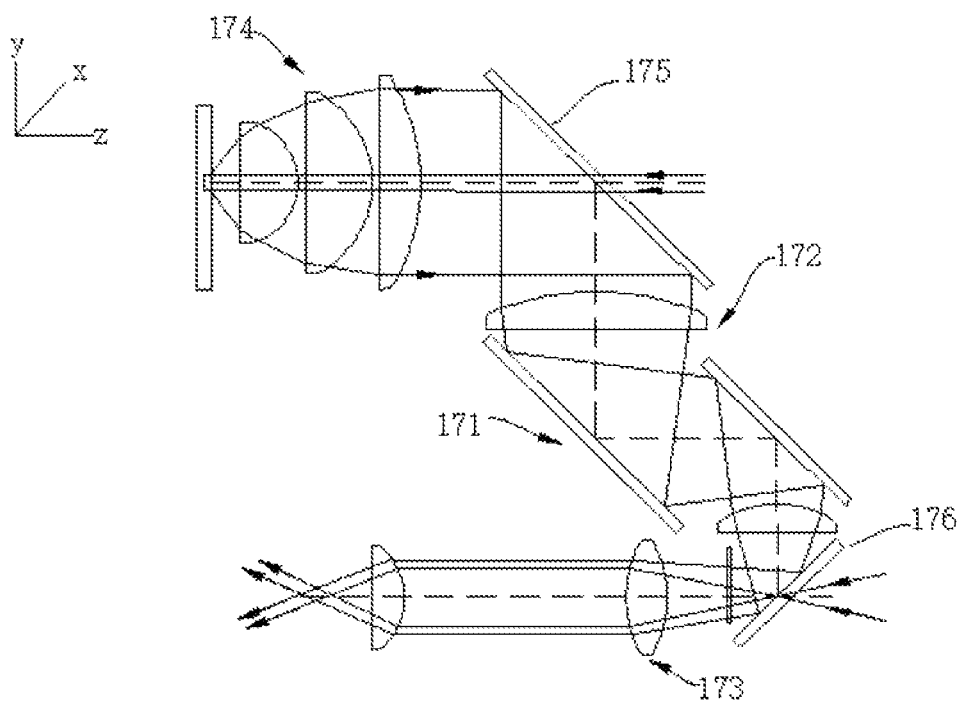
FIG. 2 is a schematic structural diagram of an imaging subsystem in the light source system provided by the first embodiment of the present disclosure.

In order to facilitate the understanding of the embodiments of the present disclosure, the embodiments of the present disclosure will be described in a more comprehensive manner with reference to related drawings. The drawings illustrate preferred embodiments of the present disclosure. However, the present disclosure can be implemented in many different forms and is not limited to the embodiments described herein. On the contrary, the purpose of providing these embodiments is to facilitate more thorough and comprehensive understanding of the present disclosure.

Unless otherwise defined, all technical and scientific terms used herein have the same meaning as commonly understood by those skilled in the technical field of the present disclosure. The terms used in the embodiments of the present disclosure herein are only for the purpose of describing specific implementation manners, and are not intended to limit the present disclosure.

First Embodiment

Please refer to FIG. 1 to FIG. 4 together. A light source system 10 provided in this embodiment includes: a laser light source 11, a supplementary light source 13, a wavelength conversion device 15 and an imaging subsystem 17. The laser light source 11 is configured to emit laser light. The supplementary light source 13 is configured to emit supplementary light. The wavelength conversion device 15 is configured to convert the laser light into excited light. The imaging subsystem 17 is configured to form a first light imaging beam, a supplementary light imagine beam, and a mixed light imaging beam. The mixed light imaging beam is formed by a combination of the first light imaging beam and the supplementary light imaging beam. The first light imaging beam, the supplementary light imaging beam and the mixed light imaging beam are transmitted in the imaging subsystem 17 and respectively form a first light imaging optical path, a supplementary light imaging optical path and a mixed light imaging optical path.

The imaging subsystem 17 includes a light combining device 176 and a reflective assembly 171. The light combining device 176 is arranged at an intersection of the first light imaging beam and the supplementary light imaging beam to combine the first light and the supplementary light and transmit the combined light along the mixed light imaging optical path. The reflective assembly 171 is placed between the wavelength conversion device 15 and the light combining device 176, and is configured to reflect the first light imaging beam. The reflective assembly 171 is mainly configured to shorten the optical path of the first light imaging beam, for example, to shorten a transmission distance of the excited light in a direction perpendicular to a transmission optical path of the laser light.

Specifically, the laser light source 11 includes a first laser device 111. It can be understood that the laser light source 11 may also include a laser light homogenizing device 113, the first laser device 111 is configured to generate laser light along a z-axis direction, and the laser light homogenizing device 113 is configured to homogenize the laser light. The laser light homogenizing device 113 may include a fly-eye lens, a homogenizing rod, a diffuser, or a scattering wheel.

In this embodiment, the laser light source 11 is a blue light source. It can be understood that the laser light source 11 is not limited to the blue light source, and may also be a purple light source, a red light source, or a green light source. The first laser device 111 is a blue laser device and is configured to emit blue laser light as the laser light source 11. The first laser device 111 may include one, two or more blue laser devices. The specific number of laser devices can be selected according to actual needs. The laser device can be a laser diode (LD) or a light emitting diode (LED), etc.

Figure 3:
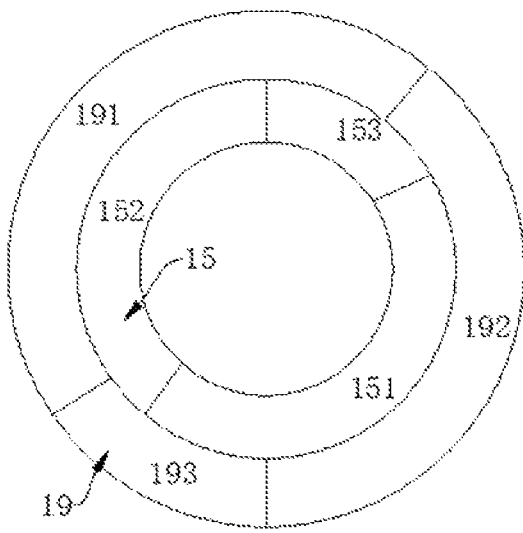
FIG. 3 is a schematic right side view of a structure of a wavelength conversion to device of the light source system shown in FIG. 1.

As shown in FIG. 3, in this embodiment, the wavelength conversion device 15 is a reflective color wheel (such as a wavelength conversion layer directly coated on a reflective substrate), and the wavelength conversion layer is a wavelength conversion material layer or a diaphragm formed by sintering a wavelength conversion material and a cohesive material, etc., and the wavelength conversion material includes but is not limited to phosphor, quantum dot materials, etc. Of course, the wavelength conversion device 15 may otherwise be a transmissive wavelength conversion device, which for example includes a transparent substrate and a wavelength conversion material doped in the transparent substrate. The wavelength conversion device 15 is divided into a red color section 151, a green color section 152, and a blue color section 153. Wavelength conversion materials corresponding to the sections are red phosphor, green phosphor and blue phosphor, respectively. It can be understood that the wavelength conversion materials can also be yellow phosphor, yellow-green phosphor, etc.

The wavelength conversion device 15 is configured to convert laser light into excited light. Specifically, after the laser light is incident onto the wavelength conversion device 15, the phosphor on the surface of the wavelength conversion device 15 is excited to generate the excited light, and then emits first light including the excited light and the laser light. The wavelength conversion device 15 may emit the excited light and the laser light according to a time sequence, or emit the laser light and the excited light simultaneously. The excited light forms a first light imaging beam after being emitted from the wavelength conversion device 15, which is transmitted in the imaging subsystem 17 to form a first light imaging optical path.

In this embodiment, the wavelength conversion device 15 is driven by a driving device 16. The driving device 16 drives the wavelength conversion device 15 to rotate about its rotation axis. On the one hand, it prevents the laser light from acting on a same position of the wavelength conversion device 15 for a long time to cause an excessively high local temperature, thereby reducing the service life of the wavelength conversion device 15 and on the other hand, the rotation of the wavelength conversion device 15 can also alternately generate fluorescent light of different colors. In other embodiments, the wavelength conversion device 15 may be a structure of a strip shape, and the wavelength conversion materials are sequentially distributed in different regions, and the driving device 16 accordingly adopts a linear translation mechanism.

The imaging subsystem 17 further includes a light converging assembly 174, which is arranged close to the wavelength conversion device 15 for converging and collimating the excited light.

Specifically, the light converging assembly 174 includes several convex lenses arranged coaxially. The optical axis of the convex lenses is perpendicular to the surface of the wavelength conversion device 15. The focal lengths of the convex lenses can be different from one another. The closer the light converging assembly 174 is to the wavelength conversion device 15, the smaller the focal length of the convex lens is. The distance between the light converging assembly 174 and the wavelength conversion device 15 and the curvature of each convex lens in the light converging assembly 174 all have influences on the site of the light spot irradiated by the laser light onto the wavelength conversion device 15, thereby affecting an outputting angle of the excited light from the light source system 10.

The imaging subsystem 17 further includes a light guiding device 175, which can be arranged between the laser light source 11 and the wavelength conversion device 15 to guide the laser light to the wavelength conversion device 15 and guide the first light to the light combining device 176. For example, the light guiding device 175 transmits the laser light to allow the laser light to enter the wavelength conversion device 15, and the light guiding device 175 also reflects the first light emitted from the wavelength conversion device 15. The first light imaging beam forms an intermediate image M on or near the light combining device 176 through action of the imaging subsystem 17. The first light emitted from the wavelength conversion device 15 will form an image, and the image is reproduced on or near the light combining device 176 under the action of the imaging subsystem and is called an intermediate image M. It can also be understood that the image formed at the wavelength conversion device 15 moves forward to form another image at a position of M, and the intermediate image has the same size as the image formed at the wavelength conversion device.

Figure 4:
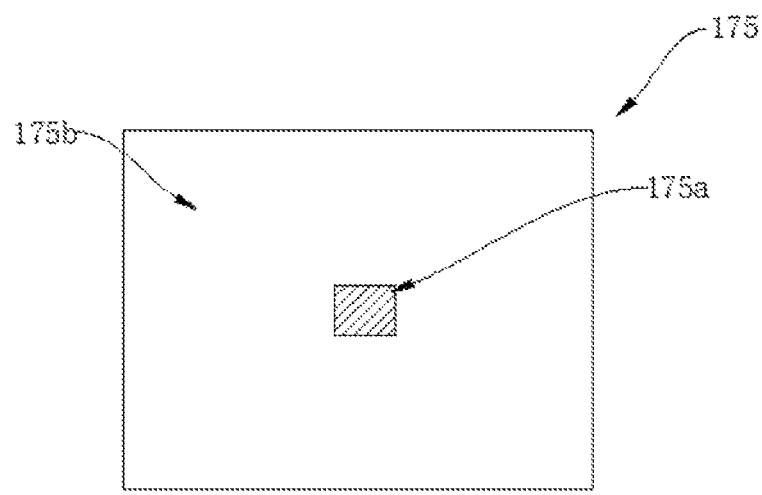
FIG. 4 is a schematic top view of a structure of a light guiding device of the light source system shown in FIG. 1.

Referring to FIG. 4 separately, the light guiding device 175 includes a transmissive region 75a and a reflective region 175b surrounding the transmissive region 175a. The transmissive region 175a is arranged at the middle light guide device 175, has a smaller area and is configured to transmit the laser light as well as a small part of the excited light. Therefore, the area of the transmissive region 175a can be reduced, thereby reducing the lost amount of the excited light in the transmissive region 175a. The reflective region 175b is configured to reflect the excited light. In this embodiment, the excited light is emitted along a y-axis direction after being reflected by the light guiding device 175, where the y-axis direction is a direction perpendicular to the transmission optical path of the laser light.

The imaging subsystem 17 further includes a first relay assembly 172, which is disposed between the light guiding device 175 and the light combining device 176, and the first relay assembly 172 configured to converge the excited light.

In this embodiment, the first relay assembly 172 includes a first convex lens 172a and a second convex lens 172b, and optical axes of the first convex lens 172a and the second convex lens 172b are parallel to each other.

It can be understood that the type and number of convex lenses in the first relay assembly 172 are not limited, and they can all be plano-convex lenses, or double-convex lenses, or a combination thereof.

The imaging subsystem 17 further includes a reflective assembly 171 which is placed between wavelength conversion device 15 and the light combining device 176. Specifically, the reflective assembly 171 is placed in a spatial structure formed by the light guiding device 175, the light combining device 176, and the wavelength conversion device 15, and the reflective assembly 171 is configured to reflect the first light imaging beam. The reflective assembly 171 includes a first reflective unit 171a and a second reflective unit 171b. The first reflective unit 171a and the second reflective unit 171b are arranged parallel to each other, and reflective surfaces of the first reflective unit 171a and the second reflective unit 171b face each other. The second reflective unit 171a and the second reflective unit 171b are both located between the first convex lens 172a and the second convex lens 172b, that is, both located on the first light imaging optical path between the first convex lens 172a and the second convex lens 172b. Through the reflection effect of the first reflective unit 171a and the second reflective unit 171b, a distance in the y-axis direction between the first convex lens 172a and the second convex lens 172b is shortened, and the length of the light source in the y-axis direction is compressed, thereby reducing the size of the wavelength conversion device 15 and the thickness of the light source, and miniaturizing the light source system 10.

The supplementary light source 13 is configured to emit supplementary light to improve the brightness of outputted light and the purity of the primary colors of the light source system 10, and expanding a color gamut space of the outputted light. The supplementary light source 13 includes a second laser device 132. It can be understood that the supplementary light source 13 may further include a supplementary light homogenizing device 134 and a relay lens 136.

The second laser device 132 is configured to emit supplementary light, the supplementary light homogenizing device 134 is configured to homogenize the supplementary light, and the relay lens 136 is configured to converge the supplementary light outputted from the supplementary light homogenizing device 134 to form a supplementary light imaging beam, which is transmitted in the imaging subsystem 17 to form a supplementary light imaging optical path. The supplementary light imaging beam and the first light imaging beam are combined at the intermediate image M to form a mixed light imaging beam, which is transmitted in the imaging subsystem 17 to form a mixed light imaging optical path.

In this embodiment, the supplementary light source 13 is a red-green light source, which emits red supplementary light and green supplementary light. It can be understood that the supplementary light source 13 is not limited to the red-green light source, and the supplementary light source 13 may also be separately a red light source, a green light source, or a purple light source, etc. The color of the supplementary light emitted by the supplementary light source 13 can be configured according to the different requirements on the excited light. For example, when light of a certain color in the excited light is insufficient, the supplementary light is the light of that color. The second laser device 132 includes a red laser device and a green laser device, configured to emit red laser light and green laser light as supplementary light. It can be understood that the second laser device 132 may include one or two laser devices or a laser device matrix. The specific number of laser devices can be selected according to actual needs. The laser device may be a LD or a LED, etc.

The imaging subsystem 17 further includes a light combining device 176, which is at the intersection of the first light imaging beam and the supplementary light imaging beam, and is configured to combine the first light and the supplementary light and transmit the combined light along the mixed light imaging optical path. Specifically, the light combining device 176 is configured to transmit the supplementary light imaging beam, and the light combining device 176 is further configured to reflect the first light imaging beam. In other embodiments, the light combining device 176 may otherwise reflect the supplementary light imaging beam and transmit the first light imaging beam.

The imaging subsystem 17 further includes a second relay assembly 173 for converging the mixed light imaging beam, and the second relay assembly 173 is arranged between the light combining device 176 and the wavelength conversion device 15.

In this embodiment, the second relay assembly 173 includes a third convex lens 173a and a fourth convex lens 173b, and optical axes of the third convex lens 173a and the fourth convex lens 173b are parallel to each other. The optical axis of the third convex lens 173a and the optical axis of the first convex lens 172a may be perpendicular to each other.

It can be understood that the convex lenses in the second relay assembly 173 are not limited in type, and may both be plano-convex lenses, or double-convex lenses, or a combination thereof. The number of lenses of the second relay assembly 173 is not limited, and the second relay assembly 173 may include two lenses, three lenses, or more lenses.

The light source system 10 further includes a filter device 19, and the function of the filter device 19 is to obtain primary-color light with higher color purity, i.e., a wider color gamut display. For example, a red filter is used to filter yellow fluorescent light to obtain red-primary-color light. In this embodiment, the filter device 19 is integrated with the wavelength conversion device 15. The filter device 19 is located on the periphery of the wavelength conversion device 15. It can be understood that, in other embodiments, the filter device 19 and the wavelength conversion device 15 may be provided separately. The filter device 19 is divided into three filter segments, namely, a red color filter segment 191, a green color filter segment 192, and a blue color filter segment 193. The mixed light imaging beam passes through the three filter segments to respectively obtain corresponding primary-color light.

Hereinafter, referring to FIG. 1, the above-mentioned light source system 10 provided in this embodiment will be described with a specific example. The first laser device 111 emits blue laser light, which is then incident onto the wavelength conversion device 15 after sequentially passing through the laser light homogenizing device 113, the transmission of the transmissive region 175a of the light guiding device 175, and the light converging assembly 174. The phosphors in the various color sections in the laser light wavelength conversion device 15 generate different excited light, which, after being reflected, is sequentially subjected to collimation of the light converging assembly 174 and the guidance of the light guide device 175 and then enters the first convex lens 172a. Then, after being reflected by the first reflective unit 171a and the second reflective unit 171b, the light enters the second convex lens 172b, then further enters the light combining device 176, and then is reflected by the light combining device 176 to form an intermediate image M.

The second laser device 132 emits red-green laser light, which is transmitted by the supplementary light homogenizing device 134, the relay lens 136, and the light combining device 176 in sequence, and then is combined with the excited light reflected by the light combining device 176 at the intermediate image M.

A divergence angle of the light beam of the intermediate image M can be changed by changing the radius of curvature of the first convex lens 172a and the second convex lens 172b in such a manner that the divergence angle of the intermediate image M is consistent with that of the red-green laser light, and the light combination is performed using the difference in etendue between the laser light and the excited light.

The combined light is incident onto the filter device 19 after being converged by the third convex lens 173a and the fourth convex lens 173b, and finally is emitted from the light source system 10 after being homogenized by the square rod 18.

In summary, in the light source system 10 provided in this embodiment, the optical path is folded by arranging the reflective assembly 171 in the first relay assembly 172, which makes reasonable use of the optical path, shortens the transmission distance of the excited light in the y-axis direction, and reduces a length (i.e., diameter) of the wavelength conversion device 15 in the y-axis direction. Therefore, the wavelength conversion device 15 is miniaturized and the utilization rate of the space in the first light imaging optical path is improved, thereby reducing the volume of the light source system 10.

Second Embodiment

Figure 5:
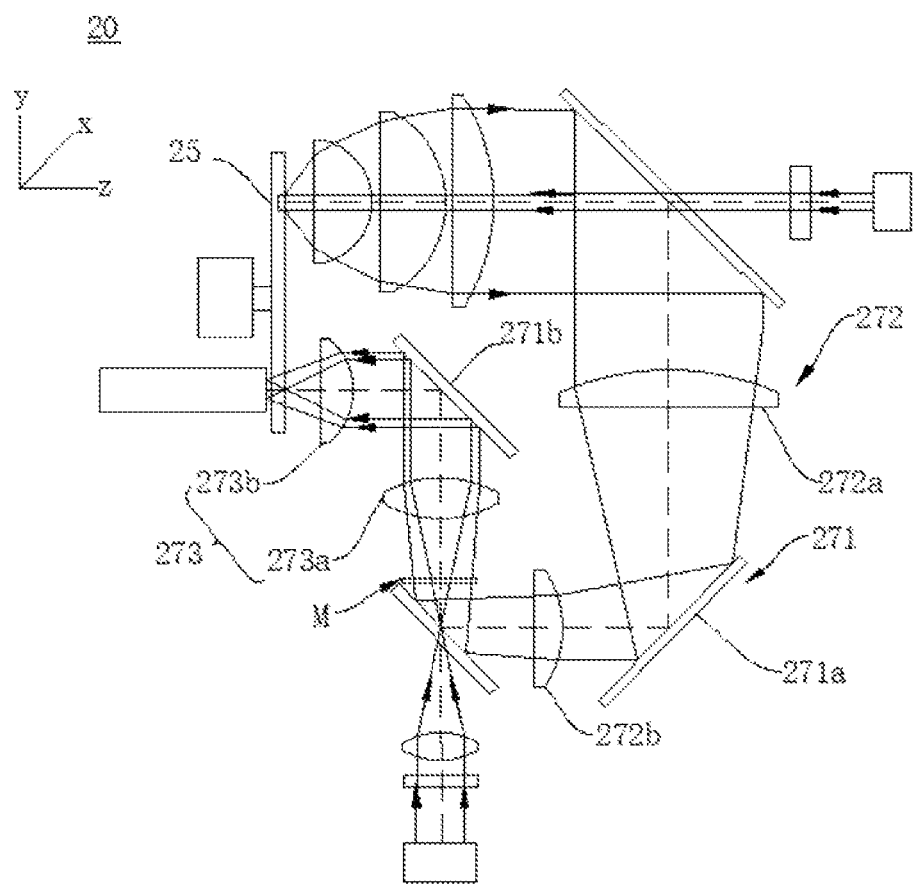
FIG. 5 is a schematic structural diagram of a light source system provided by a second embodiment of the present disclosure.

Referring to FIG. 5, the difference from the first embodiment is that the reflective assembly 271 in the light source system 20 provided in this embodiment is further configured to reflect the mixed light imaging beam, the optical axis of the first convex lens 272a is perpendicular to the optical axis of the second convex lens 272b, the optical axis of the third convex lens 273a is perpendicular to the optical axis of the fourth convex lens 273b, and the optical axis of the third convex lens 273a may be parallel to the optical axis of the first convex lens 272a. The first reflective unit 271a is arranged between the first convex lens 272a and the second convex lens 272b, and the second reflective unit 271b is arranged between the third convex lens 273a and the fourth convex lens 273b. That is, the first reflective unit 271a is located in the first light imaging optical path between the first convex lens 272a and the second convex lens 272b, and the second reflective unit 271b is located in the mixed light imaging optical path between the third convex lens 273a and the fourth convex lens 273b.

In the light source system 20 provided in this embodiment, by providing the first reflective unit 271a in the first relay assembly 272, the transmission distance of the excited light in the y-axis direction is shortened. By providing the second reflective unit 271b in the second relay assembly 273, the transmission distance of the mixed light in the y-axis direction is shortened. The optical path is folded, so that the optical path is reasonably utilized. Since the transmission distances of the excited light and the mixed light in the y-axis direction are both shortened, the length (i.e. diameter) of the wavelength conversion device 25 in the y-axis direction is reduced, and the wavelength conversion device 25 is miniaturized. In addition, the utilization rate of the space both in the first light imaging optical path and in the mixed light imaging optical path is improved, thereby reducing the volume of the light source system 20.

Third Embodiment

Figure 6:
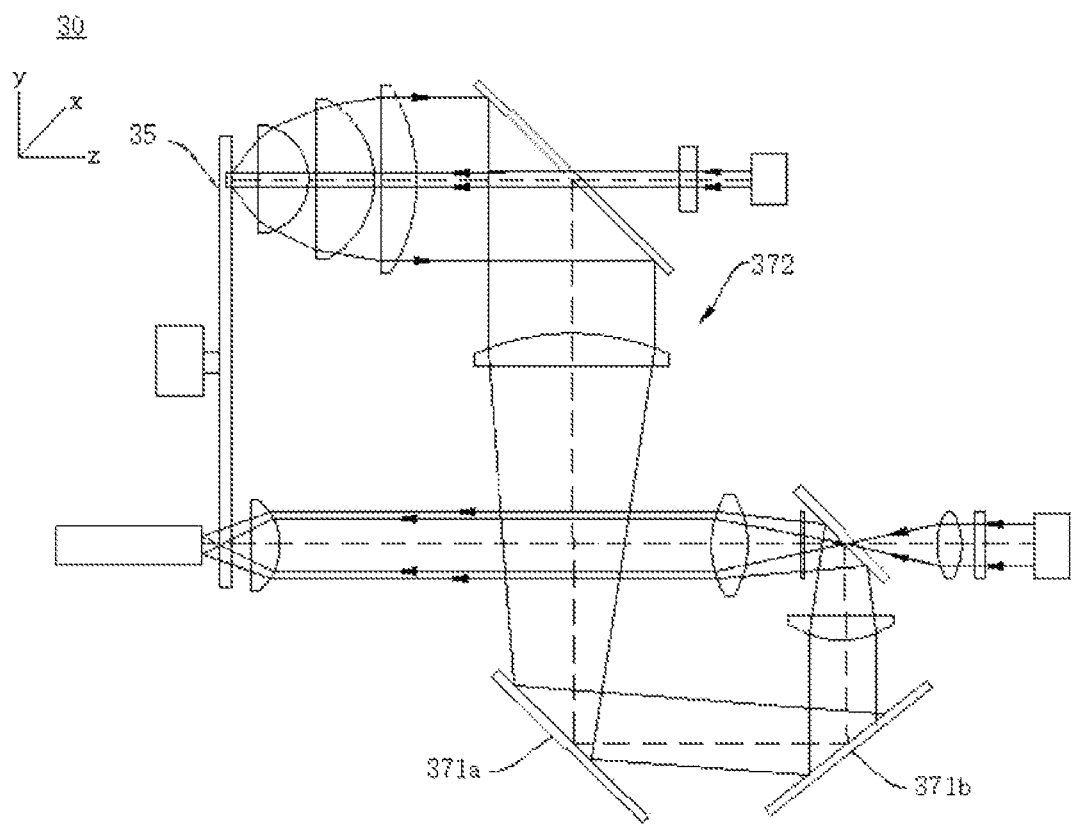
FIG. 6 is a schematic structural diagram of a light source system provided by a third embodiment of the present disclosure.

Referring to FIG. 6, the difference from the first embodiment is that the first reflective unit 371a and the second reflective unit 371b in the light source system 30 provided in this embodiment are opposite to each other, that is, the reflective surfaces of the first reflective unit 371a and the second reflective unit 371b face each other.

In the light source system 30 provided in this embodiment, the optical path is folded by arranging the first reflective unit 371a and the second reflective unit 371b in the first relay assembly 372, the first reflective unit 371a and the second reflective unit 371b are opposite to each other, so that the optical path is reasonably utilized, thereby shortening the transmission distance of the excited light in the y-axis direction and reducing the length (i.e., diameter) of the wavelength conversion device 35 in the y-axis direction. Therefore, the wavelength conversion device 35 is miniaturized and the utilization rate of the space in the first light imaging optical path is improved, thereby reducing the volume of the light source system 30.

Fourth Embodiment

Figure 7:
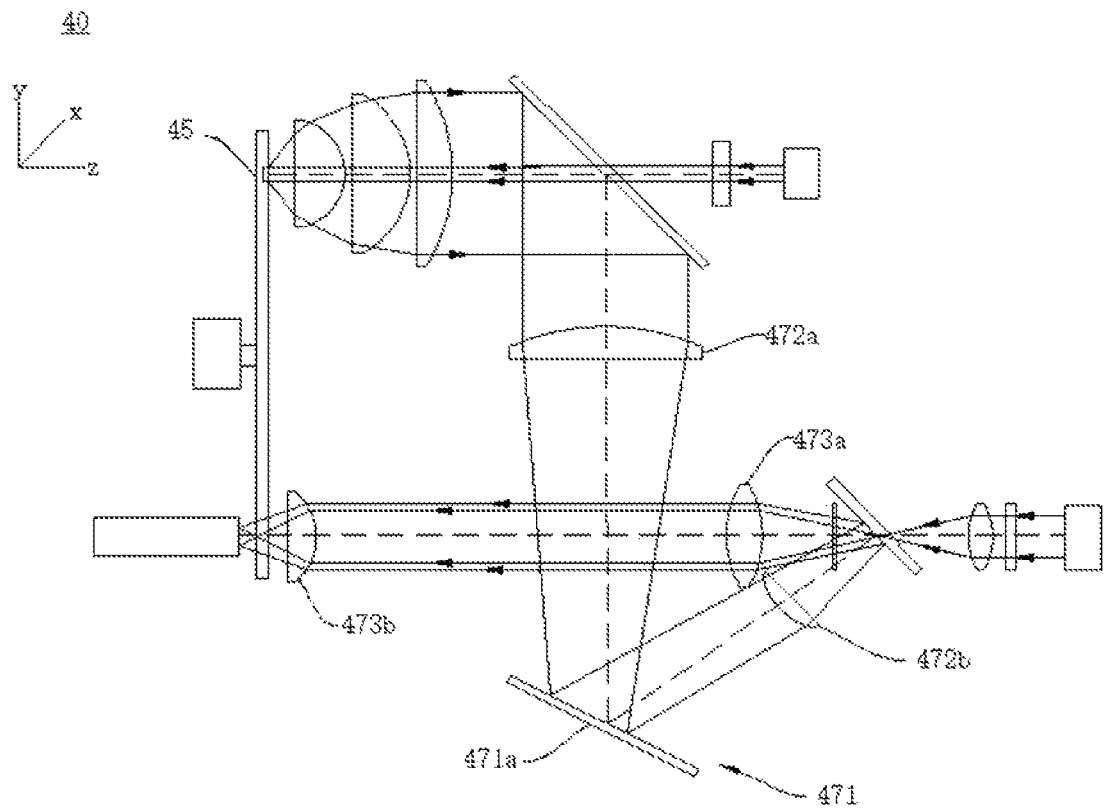
FIG. 7 is a schematic structural diagram of a light source system provided by a fourth embodiment of the present disclosure.

Referring to FIG. 7, the difference from the first embodiment is that the optical axis of the first convex lens 472a and the optical axis of the second convex lens 472b in the light) source system 40 provided by this embodiment intersect to form an acute angle, and the optical axis of the third convex lens 473a is parallel to the optical axis of the fourth convex lens 473b. The optical axis of the third convex lens 473a and the optical axis of the first convex lens 472a may be perpendicular to each other. The reflective assembly 471 includes only one mirror 471a, which is located between the first convex lens 472a and the second convex lens 472b, that is, the mirror 471a is located in the first light imaging optical path between the first convex lens 472a and the second convex lens 472b.

In the light source system 40 provided in this embodiment, by introducing only one mirror 471a, the manufacturing cost of the light source system and the space of the light source system are saved. The optical path is folded by arranging the mirror 471a between the first convex lens 472a and the second convex lens 472b, so that the optical path is reasonably utilized, the transmission distance of the excited light in the y-axis direction is shortened, and the length (i.e., diameter) of the wavelength conversion device 45 in the y-axis direction is reduced. Therefore, the wavelength conversion device 45 is miniaturized, and the utilization rate of the space in the first light imaging optical path is improved, thereby reducing the volume of the light source system 40.

Fifth Embodiment

Figure 8:
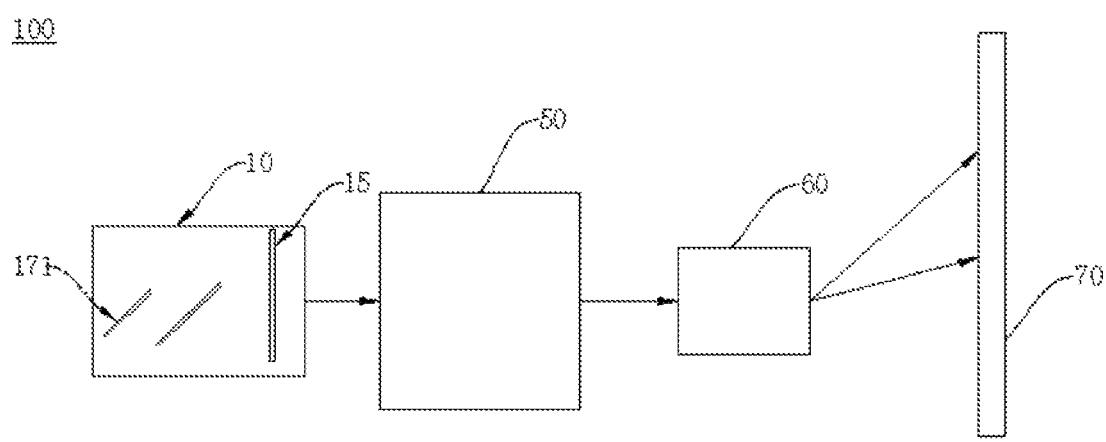
FIG. 8 is a schematic structural diagram of a projection device provided by a fifth embodiment of the present disclosure.

Referring to FIG. 8, this embodiment provides a projection device 100, which includes the light source system 10, it should be understood that, in other embodiments, the projection device 100 may include the light source system described in any of the above embodiments. The projection device 100 at least further includes an optical engine 50, a lens 60, and a projection screen 70, etc. The structures and connection relationships of the optical engine 50, the lens 60, the projection screen 70 and other components can refer to the prior art, and will not be repeated herein.

The projection device 100 provided in this embodiment includes a light source system 10. By providing the reflective assembly 171 in the light source system 10 to reflect the first light imaging beam, the optical path is folded, so that the optical path is reasonably utilized, and the transmission distance of the excited light in the y-axis direction is shortened, and the length (i.e., diameter) of the wavelength conversion device 15 in the y-axis direction is reduced. Therefore, the wavelength conversion device 15 is miniaturized, and the utilization rate of the space in the first light imaging optical path is improved, thereby reducing the volume of the light source system 10, and thus reducing the volume of the projection device 100.

The above-mentioned embodiments merely describe several implementations of the present disclosure, and the description thereof is relatively specific and detailed but shall not be illustrated as a limitation to the patent scope of the present disclosure. It should be pointed out that for those skilled in the art, without departing from the concept of the present disclosure, several modifications and improvements can be made, and all of these modifications and improvements shall fall within the protection scope of the present disclosure. Therefore, the protection scope of the present disclosure shall be defined by the appended claims.

What is claimed is:

1. A light source system, comprising:
   a laser light source configured to emit laser light;
   a supplementary light source configured to emit supplementary light;
   a wavelength conversion material carrier configured to convert the laser light into excited light, and output first light comprising the excited light and the laser light; and
   an imaging subsystem configured to form a first light imaging beam, a supplementary light imaging beam, and a mixed light imaging beam, wherein the mixed light imaging beam is formed by a combination of the first light imaging beam and the supplementary light imaging beam, the first light imaging beam, the supplementary light imaging beam and the mixed light imaging beam are transmitted in the imaging subsystem and respectively form a first light imaging optical path, a supplementary light imaging optical path and a mixed light imaging optical path;
   wherein the imaging subsystem comprises a light combining device and a reflective assembly having at least one mirror, whereby the light combining device is placed at an intersection of the first light imaging beam and the supplementary light imaging beam and is configured to combine the first light and the supplementary light and transmit combined light along the mixed light imaging optical path, and the reflective assembly is placed between the wavelength conversion material carrier and the light combining device and is configured to reflect the first light imaging beam; and
   wherein the first light imaging beam forms an intermediate image on or near the light combining device under an action of the imaging subsystem, and the first light imaging beam and the supplementary light imaging beam are combined at the intermediate image.

2. The light source system of claim 1, wherein the imaging subsystem further comprises a light guiding device placed between the laser light source and the wavelength conversion material carrier, the imaging subsystem being configured to guide the laser light to the wavelength conversion material carrier and to guide the first light to the light combining device; and
   wherein the light guiding device comprises a transmissive region and a reflective region.

3. The light source system of claim 2, wherein the reflective assembly is placed in a spatial structure formed by the light guiding device, the light combining device, and the wavelength conversion material carrier.

4. The light source system of claim 2, wherein the imaging subsystem further comprises a first relay assembly having convex lenses and a second relay assembly having convex lenses, the first relay assembly is configured to converge the excited light and is arranged between the light guiding device and the light combining device, the second relay assembly is configured to converge mixed light formed by mixing the excited light and the supplementary light, and the imaging subsystem is arranged between the light combining device and the wavelength conversion material carrier.

5. The light source system of claim 4, wherein the first relay assembly comprises a first convex lens and a second convex lens, an optical axis of the first convex lens is parallel to an optical axis of the second convex lens, the second relay assembly comprises a third convex lens and a fourth convex lens, and an optical axis of the third convex lens is parallel to an optical axis of the fourth convex lens.

6. The light source system of claim 5, wherein the reflective assembly comprises a first reflective mirror and a second reflective mirror, the first reflective mirror is arranged parallel to the second reflective mirror, and the first reflective mirror and the second reflective mirror are each located between the first convex lens and the second convex lens.

7. The light source system of claim 5, wherein the reflective assembly comprises a first reflective mirror and a second reflective mirror, the first reflective mirror and the second reflective mirror are opposite to each other, and the first reflective mirror and the second reflective mirror are both located between the first convex lens and the second convex lens.

8. The light source system of claim 4, wherein the first relay assembly comprises a first convex lens and a second convex lens, an optical axis of the first convex lens and an optical axis of the second convex lens intersect to form an acute angle, the second relay assembly comprises a third convex lens and a fourth convex lens, and an optical axis of the third convex lens is parallel to an optical axis of the fourth convex lens.

9. The light source system of claim 8, wherein the reflective assembly comprises only one mirror, which is located between the first convex lens and the second convex lens.

10. The light source system of claim 4, wherein the reflective assembly is further configured to reflect the mixed light imaging beam.

11. The light source system of claim 10, wherein the first relay assembly comprises a first convex lens and a second convex lens, an optical axis of the first convex lens is perpendicular to an optical axis of the second convex lens, the second relay assembly comprises a third convex lens and a fourth convex lens, and an optical axis of the third convex lens is perpendicular to an optical axis of the fourth convex lens.

12. The light source system of claim 11, wherein the reflective assembly comprises a first reflective mirror and a second reflective mirror, the first reflective mirror is located between the first convex lens and the second convex lens, and the second reflective mirror is located between the third convex lens and the fourth convex lens.

13. A projection device, comprising a light source system, wherein the light source system comprises:
   a laser light source configured to emit laser light;
   a supplementary light source configured to emit supplementary light;
   a wavelength conversion material carrier configured to convert the laser light into excited light, and output first light comprising the excited light and the laser light; and
   an imaging subsystem configured to form a first light imaging beam, a supplementary light imaging beam, and a mixed light imaging beam, wherein the mixed light imaging beam is formed by a combination of the first light imaging beam and the supplementary light imaging beam, the first light imaging beam, the supplementary light imaging beam and the mixed light imaging beam are transmitted in the imaging subsystem and respectively form a first light imaging optical path, a supplementary light imaging optical path and a mixed light imaging optical path;
   wherein the imaging subsystem comprises a light combining device and a reflective assembly having at least one mirror, whereby the light combining device is placed at an intersection of the first light imaging beam and the supplementary light imaging beam and is configured to combine the first light and the supplementary light and transmit combined light along the mixed light imaging optical path, and the reflective assembly is placed between the wavelength conversion material carrier and the light combining device and is configured to reflect the first light imaging beam; and
   wherein the first imaging beam forms an intermediate image on or near the light combining device under an action of the imaging subsystem, and the first light imaging beam and the supplementary light imaging beam are combined at the intermediate image.

14. The projection device of claim 13, wherein the imaging subsystem further comprises a light guiding device placed between the laser light source and the wavelength conversion material carrier, the image subsystem being configured to guide the laser light to the wavelength conversion material carrier and to guide the first light to the light combining device; and
   wherein the light guiding device comprises a transmissive region and a reflective region.

15. The projection device of claim 14, wherein the reflective assembly is placed in a spatial structure formed by the light guiding device, the light combining device, and the wavelength conversion material carrier.

16. The projection device of claim 14, wherein the imaging subsystem further comprises a first relay assembly having convex lenses and a second relay assembly having convex lenses, the first relay assembly is configured to converge the excited light and arranged between the light guiding device and the light combining device, the second relay assembly is configured to converge mixed light formed by mixing the excited light and the supplementary light, and arranged between the light combining device and the wavelength conversion material carrier.

17. The projection device of claim 16, wherein the first relay assembly comprises a first convex lens and a second convex lens, an optical axis of the first convex lens is parallel to an optical axis of the second convex lens, the second relay assembly comprises a third convex lens and a fourth convex lens, and an optical axis of the third convex lens is parallel to an optical axis of the fourth convex lens.

18. The projection device of claim 16, wherein the reflective assembly is further configured to reflect the mixed light imaging beam.

* * * * *